United States Patent [19]
Joó

[11] 4,127,634
[45] Nov. 28, 1978

[54] SULFUR/GRAPHITE FIBER ELECTRODE FOR SODIUM-SULFUR BATTERIES
[75] Inventor: Louis A. Joó, Johnson City, Tenn.
[73] Assignee: Great Lakes Carbon Corporation, New York, N.Y.
[21] Appl. No.: 866,940
[22] Filed: Jan. 4, 1978

Related U.S. Application Data
[62] Division of Ser. No. 750,973, Dec. 15, 1976, abandoned.
[51] Int. Cl.² ............................................. H01M 4/04
[52] U.S. Cl. .................................. 264/105; 429/104; 429/209

[58] Field of Search ................. 264/104, 105; 429/104, 429/209, 218, 232; 252/439, 425.3

[56] References Cited
U.S. PATENT DOCUMENTS
3,748,178   7/1973   Fally et al. ........................... 429/104

Primary Examiner—Anthony Skapars
Attorney, Agent, or Firm—R. Laddie Taylor

[57] ABSTRACT
A sulfur electrode for a sodium-sulfur secondary battery comprises a mixture of chopped graphite fibers and sulfur formed into a solid composite structure.

2 Claims, No Drawings

SULFUR/GRAPHITE FIBER ELECTRODE FOR SODIUM-SULFUR BATTERIES

This is a division of application Ser. No. 750,973, filed Dec. 15, 1976, now abandoned.

BACKGROUND OF THE INVENTION

1 - Field of the Invention

This invention relates to sodium-sulfur storage batteries and particularly to a novel sulfur electrode for such a battery.

2 - Description of Prior Art

The conventional sodium-sulfur secondary battery comprises a casing containing sodium and sulfur reactants, the reactants being molten at the operating temperature of the battery, separated by a solid electrolyte, such as beta-alumina ceramic. During discharge, the sodium is ionized and these ions pass through the solid electrolyte and react with sulfur in the sulfur electrode which conventionally comprises sulfur that is molten at the battery operating temperature and a current collector, to form sodium polysulfide ($Na_2S_x$). The energy generated by this reaction is electrically removed from the battery through terminals provided therein. The battery may be recharged by supplying current thereto from an external source in the reverse direction, causing the sodium polysulfide produced during discharge to decompose and pass as sodium ions through the solid electrolyte to the molten sodium region of the cell where metallic sodium is formed by electron addition.

It is important in a battery of this type that the current collector portion of the sulfur electrode has a high current collecting ability, and it is required that the structure has high strength and excellent corrosion resistance. Additionally, good sodium-sulfur battery performance depends to a large extent on the distribution of sulfur in the current collector.

It is well known in the prior art to utilize carbon or graphite felt or yarn in various forms as the current collector portion of the sulfur electrode for a sodium-sulfur battery. U.S. Pat. No. 3,883,367 - Chiku et al., for example, discloses a sodium-sulfur battery having a porous current collector formed of a knitted or woven carbon yarn as part of its sulfur electrode. Sulfur is absorbed on the felt or yarn and wicking is the dominant mode for mass transport of reactants in the sulfur electrode during operation thereof. Acceptable performance in this type of battery requires a continuous generally uniform distribution of high porosity carbon or graphite throughout the sulfur electrode and the amount of absorbance of the reactants by the felt or yarn essentially depends on the available surface area per unit volume of absorbent.

While known current collectors for sulfur electrodes in sodium-sulfur batteries partially fulfill the requirements presented above, several problems remain unsolved. It is obvious that ideal sulfur distribution cannot be obtained in current collectors known in the art, in view of the methods of adding the molten sulfur to the collector. Further, the carbon or graphite felt or yarn conventionally utilized in the current collector cannot be uniformly distributed in the battery due to the flexibility of this material. The material must be pressed against the solid electrolyte by a backing plate to assure adequate electrical contact thereto. This pressure restricts the flow of $Na_2S_x$ through the current collector. Additionally, due to the physical characteristics of the material, it is not possible to machine the current collector to required specifications.

SUMMARY OF THE INVENTION

This invention provides an improved sulfur electrode for a sodium-sulfur secondary battery comprising a formed sulfur-chopped graphite fiber composite structure. The electrode is manufactured by: forming a mixture comprising about 1 to about 20 wt. % chopped graphite fibers, preferably having a length of about one-thirty-second to about three-fourths inch, with about 99 to about 80 wt. % powdered sulfur based on the weight of the total mixture; shaping the mixture at a temperature in the range of about 110°–135° C. under a pressure sufficient to provide required electrode configuration; and cooling the shaped mixture to a temperature below the melting point of the sulfur.

The sulfur electrode of the invention fulfills the requirement that the sulfur be evenly distributed in the current collector, since the graphite fibers forming the collector are mixed with sulfur before it is inserted in the battery. Further, the formed structure can be machined to the exact specifications required and is easily handled during processing. Additionally, the electrode is substantially less expensive to fabricate than known sulfur electrodes, especially those requiring intricate knitting or weaving.

DESCRIPTION OF THE PREFERRED EMBODIMENT

The invention will now be described in the following non-limiting example.

Graphite fibers derived from polyacrylonitrile, regenerated cellulose, or other precursor fibers by methods well known in the art are chopped to a length of about one-eighth inch and about 10 wt. % are intimately mixed with about 90 wt. % of powdered sulfur, based on the weight of the total mixture, in a sigma blade mixer at room temperature to form a graphite fiber-sulfur mixture. This mixture is placed in a mold and compressed under a pressure of about 50 p.s.i.g. at a temperature of about 125° C. to form a sulfur-chopped graphite fiber composite, which is allowed to cool to a temperature below the melting point of the sulfur therein. The formed sulfur electrode is then machined to required tolerances for incorporation into a sodium-sulfur battery.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. A process for producing a formed sulfur-chopped graphite fiber composite sulfur electrode for use in a sodium-sulfur secondary battery comprising, in the order recited, the steps of: (a) forming a mixture comprising about 1 to about 20 wt. % chopped graphite fibers and about 99 to about 80 wt. % powdered sulfur; (b) shaping the mixture at a temperature in the range of about 110°–135° C. under a pressure sufficient to provide required electrode configuration; and (c) cooling the shaped mixture to a temperature below the melting point of the sulfur.

2. A process for producing a formed sulfur-chopped graphite fiber composite sulfur electrode for use in a sodium-sulfur secondary battery comprising, in the order recited, the steps of: (a) forming a mixture consisting of about 10 wt. % chopped graphite fibers and about 90 wt. % powdered sulfur; (b) shaping the mixture at a temperature of about 125° C. under a pressure of about 50 p.s.i.g. to provide required electrode configuration; and (c) cooling the shaped mixture to a temperature below the melting point of the sulfur.

* * * * *